April 17, 1928.
B. C. VON PLATEN ET AL
1,666,760
REFRIGERATOR
Original Filed Aug. 4, 1923
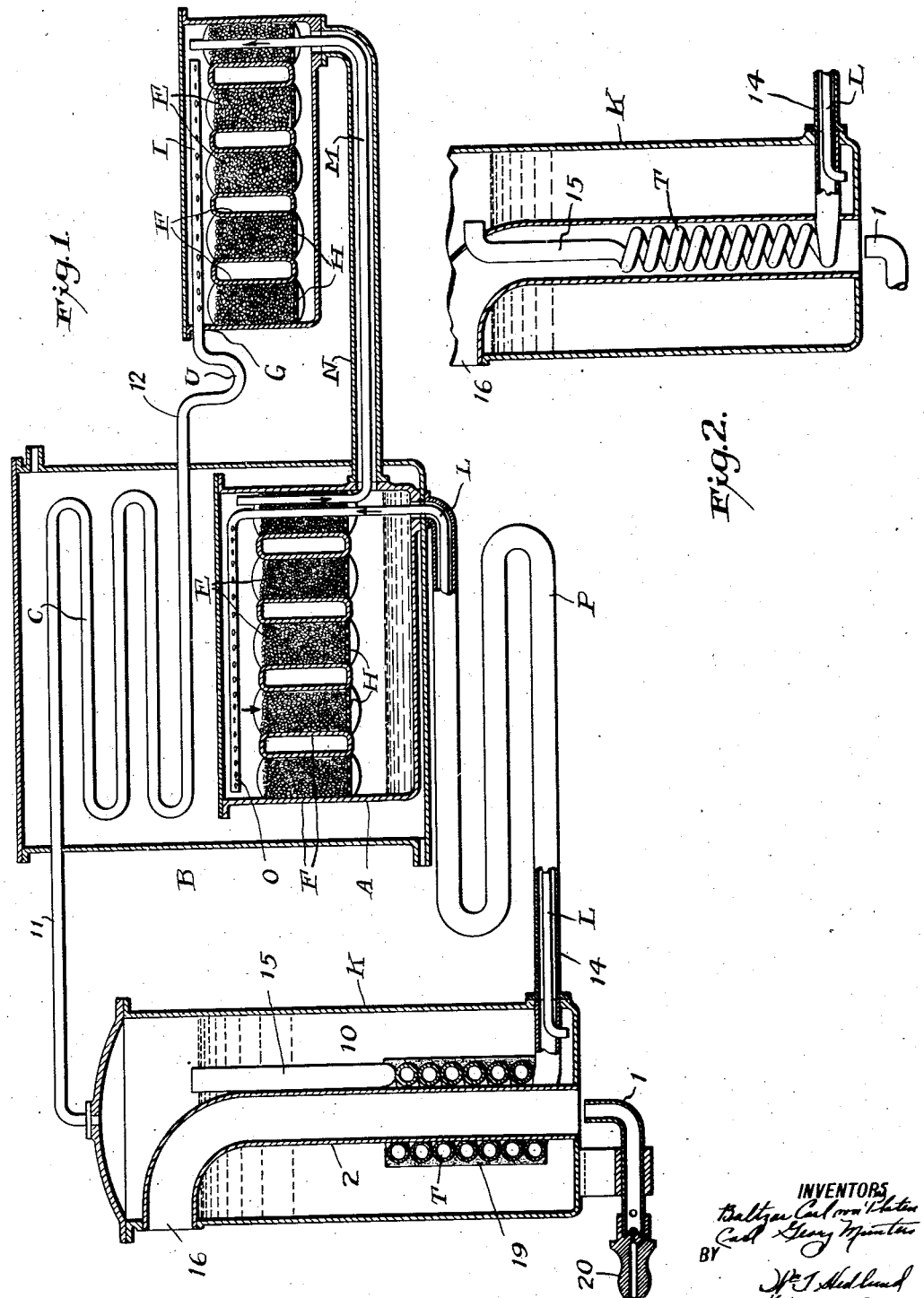

Patented Apr. 17, 1928.

1,666,760

UNITED STATES PATENT OFFICE.

BALTZAR CARL von PLATEN AND CARL GEORG MUNTERS, OF STOCKHOLM, SWEDEN, ASSIGNORS TO ELECTROLUX SERVEL CORPORATION, OF NEW YORK, N. Y., A CORPORATION OF DELAWARE.

REFRIGERATOR.

Original application filed August 4, 1923, Serial No. 655,768. Divided and this application filed April 1, 1926. Serial No. 98,951.

This application is a division of our co-pending application Serial No. 655,768 filed August 4, 1923, Pat. No. 1,620,843.

The invention relates generally to refrigerating systems of the absorption type and more specifically to refrigerating systems of the kind including a generator, a condenser, an evaporator and an absorber forming a circuit for a volatile cooling agent, the refrigerant, which is abstracted from solution by heat, condensed, evaporated in the presence of an auxiliary agent, absorbed by absorption liquid and again abstracted from solution.

Amongst the various objects of our invention are: to provide a practical highly efficient refrigerator without moving parts; to cause automatic and effective circulation of absorption liquid between and through the generator and the absorber by the direct application of heat to a stream of liquid flowing from the absorber to the generator; to provide a highly efficient refrigerator which is supplied with heat exclusively and directly by the burning of gas; and to provide a generator arrangement which is particularly effective for the circulation of liquid between the absorber and generator and for the vaporization of the cooling medium.

Further objects, novel features and advantages of the invention will be apparent as the description proceeds, which is presented with reference to the accompanying drawing, in which, Figure 1 shows a complete refrigerator embodying one form of our invention; and Figure 2 shows a modified embodiment of the invention.

Referring more particularly to Figure 1, K designates a generator which contains the cooling agent, for instance, ammonia, dissolved in a suitable absorption liquid such as water. Obviously any of various substances may be used as cooling agent and, in describing the apparatus as using ammonia, it is to be understood that this is by way of example only.

Ammonia vapor is abstracted from the solution 10 in the generator and passes through conduit 11 into the condenser C in which the vapor is condensed due to the cooling effect of a cooling fluid such as water, which is caused to circulate through the tank B in which condenser C is placed. The condenser is connected with an evaporator G, which constitutes the refrigerating member, by means of a conduit 12 in which there is a liquid seal U. Within the evaporator is a perforated distributor I which connects with conduit 12 and through the perforations of which liquid ammonia is introduced into the evaporator. Within the evaporator there is preferably placed means for distributing and dividing the liquid cooling agent over a large surface. For this purpose there is shown a series of tubular cells F which communicate with each other at the top and at the bottom and which are provided with perforated bottoms H. These cells contain a porous or fibrous material E which may consist of metal wool or cuttings.

The evaporator G is connected to the absorber A by means of conduits M and N which may be arranged, as shown, to form a heat exchanger. This is done in the example shown by having pipe M pass within pipe N. Pipe M connects the top of the absorber with the top of the evaporator and pipe N connects the bottom of the evaporator with the lower part of the absorber. The absorber is enclosed in tank B and is also cooled by the cooling fluid flowing through the same.

The generator K and absorber A are interconnected by means of pipes L and P which, as shown on the drawing, may be arranged to form a heat exchanger. Pipe L lies within pipe P and extends from the lower part of the generator to the upper part of the absorber where it terminates in a perforated distributor O. Like the evaporator, the absorber preferably contains distributing means such as the tubular cells F with perforated bottoms H containing distributing material E. Pipe P connects the lower part of the absorber with the upper part of the generator and is composed of three parts, the member T which is made in the form of a coil and is situated within the generator, the part 14 which connects the lower end of the coil with the absorber and the part 15 which connects the upper end of the coil with the upper part of the generator. The coil T is concentric with flue 2 and surrounds the same and is in close contact therewith. Flue 2 extends from the bottom of the generator upwardly through the liquid space 10 and has its outlet to one side of the generator at 16. Preferably, though not necessarily, a jacket or coating of heat insulating material 19 may be provided on the outer side of coil T.

Directed into the lower opening of flue 2 is a gas burner 1 which may be connected to any gas supply line by means of thimble 20.

The operation of the apparatus is as follows:

Gas is supplied to burner 1 and mixed with air in known manner for combustion. The gas is ignited and the gaseous products of combustion pass up through flue 2 causing the flue 2 to become a source of heat for the generator and for the circulating coil T. One of the great advantages of a refrigerator which operates on gas is the low operating cost thereof. Heretofore all successful automatic domestic refrigerators have been dependent upon electricity as a source of energy. Our invention provides a practical refrigerator for domestic use operable on gas as the sole supply of heat or other form of energy wherefore it makes possible a distinct and large saving in economy. The efficiency of the apparatus herein disclosed is not, however, due to the use of gas alone nor the provision of an apparatus adaptable to to use gas alone, but also in the unique arrangement of parts wherein direct transmission of heat from the source as well to the circulating coil T as to the absorption liquid 10 is obtained. The coil T is placed between the source of heat and the absorption liquid 10 and in close contact to the flue 2 so that there is direct transmission of heat through metal from the burner gases to the liquid within the coil. Heating of the liquid in coil T causes a circulation between the generator and the absorber, the circulation being from the lower part of the absorber through pipe 14 through the coil T and through pipe 15 to the upper part of the generator. The pressure in the generator and the absorber is substantially the same. The liquid level in the generator is higher than the liquid level in the absorber. The decrease of density of the liquid in coil T due to heating of the same causes the upward movement of liquid through pipe P from the lower level in the absorber to the higher level in the generator. Liquid flows back from the generator to the absorber through pipe L. The jacket of heat insulating material 19 serves to impede transfer of heat from the coil T to the solution 10 and, as is obvious, the more intensely the liquid in coil T is heated, the more intense is the circulation between the generator and the absorber.

Heating of solution 10 causes ammonia vapor to separate out from the solution. The ammonia vapor passes through conduit 11 into the condenser C. In condenser C the vapor is condensed and passes on through conduit 12 and liquid seal U to the evaporator. The liquid ammonia entering the evaporator is spread over the distributing material E by help of the perforated distributor I. The evaporator is supplied with an auxiliary agent such as hydrogen into which and in the presence of which the ammonia diffuses and evaporates. This process of diffusion of the cooling agent into the auxiliary agent (which obviously entails diffusion of the auxiliary agent into the cooling agent), results in evaporation of the cooling agent and abstraction of heat from the surroundings of the evaporator without however necessitating a drop in actual total pressure. Thus refrigeration is produced. The ammonia gas and hydrogen mixed in the evaporator flow downwardly therein and through pipe N into the lower part of absorber A.

In the absorber the gas mixture comes into contact with weak absorption liquid supplied thereto from the generator K through pipe L and distributor O, that is, with liquid in which there is little or no cooling agent dissolved. By this grouping of the gaseous mixture and the absorption liquid, the result is an absorption or dissolving of ammonia by water and a liberation of hydrogen. Now, since hydrogen is very much lighter than ammonia, it will be seen that the weight per unit volume of gas after being freed from ammonia in the absorber is very much less than the weight of gaseous mixture per unit volume formed in the evaporator. Therefore, with a suitable interconnection of the evaporator and absorber, one example of which is shown in the drawing and above described, there will be a preponderance of downwardly directed gravitational force produced in the evaporator which causes automatic circulation of gas between and through the evaporator and absorber. The hydrogen passes upwardly in the absorber and through pipe M into the upper part of the evaporator where it is again mixed with the heavier ammonia vapor and is carried downwardly as part of the mixture through pipe N to the lower part of the absorber in which ammonia is forced into the solution and the lighter hydrogen is freed, and again passes upwardly into the absorber. There is thus established an automatic circulation of gas between and through the evaporator and absorber.

From the above description it will be seen that there are three cycles of circulation in the apparatus one for the ammonia through the generator, condenser, evaporator and absorber; a second, for the auxiliary agent, hydrogen, through and between the evaporator and absorber; and a third for the absorption liquid between and through the generator and the absorber. The present invention is more particularly concerned with the last named circulation but the complete apparatus makes possible the use of the novel arrangement shown in that it is the complete arrangement which provides constant pressure in all the parts so that an effective operation can be obtained from our novel liquid circulating arrangement.

Figure 2 shows a modification wherein the coil T instead of being arranged around flue 2 is arranged within the same. The purpose of this arrangement is likewise to afford an intensive supply of heat to the liquid circulating member. In this case the gases of combustion likewise come into close contact with metal immediately adjacent the liquid in coil T so that there is direct transmission of heat through metal from the burner gases to liquid within the coil. The arrangement shown in Figure 2 may be used with cooperating parts as shown in Figure 1.

While we have disclosed specific embodiments of our invention it is to be understood that the invention is not limited to these specific embodiments. Many variations falling within the spirit and scope of the invention will be obvious to those skilled in the art to which the invention appertains.

Having described our invention, what we claim is:

1. A refrigerator comprising a generator, a condenser, an evaporator, an absorber, a gas burner, a coil, means to connect the upper part of the coil with the upper part of the generator, means to connect the lower part of the coil with the absorber, a conduit connecting the generator and the absorber independently of the coil, the coil being so arranged with respect to the generator and the burner that there is direct transmission of heat through metal from the burner gases to liquid within the coil.

2. A refrigerator comprising a generator, a condenser, an evaporator, an absorber, a flue extending within said generator, a gas burner directed into said flue, a coil, said coil and flue being concentrically arranged, means to connect the upper part of the coil with the upper part of the generator, means to connect the lower part of the coil with the absorber, a conduit connecting said generator with said absorber independently of the coil, the coil being so arranged with respect to the generator and the flue that there is a direct transmission of heat through metal from burner gas within the flue to liquid within the coil.

3. A refrigerator comprising a generator, a condenser, an evaporator, an absorber, a flue extending within said generator, a coil surrounding said flue, means to connect the upper part of the coil with the upper part of the generator, means to connect the lower part of the coil with the absorber, a conduit connecting said generator with said absorber independently of the coil and a burner directed into said flue.

4. A refrigerator comprising a generator, a condenser, an evaporator, an absorber, a flue extending within said generator, a coil surrounding said flue and in direct contact therewith, means to connect the upper part of the coil with the upper part of the generator, means to connect the lower part of the coil with the absorber, a conduit connecting said generator with said absorber independently of the coil and a burner directed into said flue.

5. A refrigerator comprising a generator, a condenser, an evaporator, an absorber, a flue extending within said generator, a liquid containing member surrounding and adjacent said flue, means to connect the upper part of said member with the upper part of the generator, means to connect said member with the absorber, a conduit connecting said generator with said absorber independently of said member and a gas burner directed into said flue.

6. A refrigerator comprising a generator, a condenser, an evaporator, an absorber, a flue extending within said generator, a member surrounding said flue and adapted to contain liquid, an insulating jacket surrounding said member, means to connect the upper part of the member with the upper part of the generator, means to connect said member with the absorber, a conduit connecting said generator with said absorber independently of the member and a burner directed into the flue.

7. A refrigerator comprising a generator, a condenser, an evaporator, an absorber, a gas burner, a liquid containing member, means to connect the upper part of said member with the upper part of the generator, means to connect said member with the absorber, a conduit connecting the generator and the absorber independently of said member, said member being so arranged with respect to the generator and the burner that there is direct transmission of heat through metal from the burner gases to liquid within said member.

8. A refrigerator comprising a generator, a condenser, an evaporator, an absorber, a flue extending within said generator, a member surrounding and adjacent said flue and adapted to contain liquid, means to connect the upper part of said member with the upper part of the generator, means to connect said member with the absorber, a conduit connecting said generator with said absorber independently of said member, a gas burner directed into said flue, communications between the absorber and evaporator arranged to form a circuit, said circuit being arranged to contain vertically extending bodies of fluid of such nature that circulation is caused to take place within said circuit due to difference in specific weights of different vertically extending bodies and means to connect said condenser with said generator and with said evaporator.

9. A refrigerating system comprising a generator, a condenser, an evaporator, an absorber, a flue extending within said generator, a member surrounding and adjacent said flue and adapted to contain liquid, means to connect the upper part of said member with the upper part of the generator, means to connect said member with the absorber, a conduit connecting said generator with said absorber independently of said member, a gas burner directed into said flue, additional conduits for connecting the parts of the system together, said system including means for generating force within the system and means to circulate an auxiliary agent due to said force through the evaporator and absorber in the presence of which a cooling agent evaporates.

In testimony whereof we hereunto affix our signatures.

BALTZAR CARL von PLATEN.
CARL GEORG MUNTERS.